United States Patent
Kim et al.

(10) Patent No.: US 11,928,143 B2
(45) Date of Patent: Mar. 12, 2024

(54) SYSTEMS, METHODS, AND DEVICES FOR GENERATING REAL-TIME ANALYTICS

(71) Applicant: TRUVALUE LABS, INC., San Francisco, CA (US)

(72) Inventors: Philip Kim, San Francisco, CA (US); Stephen Matthew Malinak, San Francisco, CA (US); Ganesh Rao, San Francisco, CA (US); Eli Reisman, San Francisco, CA (US); Yang Ruan, San Francisco, CA (US); Faithlyn Tulloch, San Francisco, CA (US); Eugene Wong, San Francisco, CA (US)

(73) Assignee: TRUVALUE LABS, INC.

( * ) Notice: Subject to any disclaimer, the term of this patent is extended or adjusted under 35 U.S.C. 154(b) by 124 days.

(21) Appl. No.: 17/630,008

(22) PCT Filed: Jul. 27, 2020

(86) PCT No.: PCT/US2020/043774
§ 371 (c)(1),
(2) Date: Jan. 25, 2022

(87) PCT Pub. No.: WO2021/016623
PCT Pub. Date: Jan. 28, 2021

(65) Prior Publication Data
US 2022/0277044 A1 Sep. 1, 2022

Related U.S. Application Data

(60) Provisional application No. 62/878,739, filed on Jul. 25, 2019.

(51) Int. Cl.
*G06F 16/30* (2019.01)
*G06F 16/35* (2019.01)
*G06F 16/93* (2019.01)

(52) U.S. Cl.
CPC .............. *G06F 16/35* (2019.01); *G06F 16/93* (2019.01)

(58) Field of Classification Search
CPC ........ G06F 16/35; G06F 16/901; G06F 16/93; G06F 40/284; G06F 40/295; G06F 40/30; G06Q 10/063
See application file for complete search history.

(56) References Cited

U.S. PATENT DOCUMENTS

| 2012/0023006 A1 | 1/2012 | Roser et al. |
| 2012/0203747 A1 | 8/2012 | Douetteau et al. |

(Continued)

OTHER PUBLICATIONS

Article entitled "Public Sentiment and the Price of Corporate Sustainability", by Serafeim, dated Oct. 19, 2018 (Year: 2018).*

(Continued)

*Primary Examiner* — Mahesh H Dwivedi
(74) *Attorney, Agent, or Firm* — Hunton Andrews Kurth LLP

(57) ABSTRACT

Systems of the present disclosure may ingest content from a plurality of data sources with the content including ingested documents referencing entities and events relevant to the ESG signals. The content may be stored in a content database. The System may also identify metadata and a body of text associated with each document to produce a set of preprocessed documents. An entity may be tagged to a first preprocessed document from the set of preprocessed documents, and the document may include a first document identifier. The System may generate an event score related to a first ESG signal including a direction and a magnitude associated with an event identified in the body of text. The event score may be tagged to the document. The system may write to an unstructured data set the document identifier in association with the tagged entity and the tagged event score for delivery.

8 Claims, 6 Drawing Sheets

(56) References Cited

U.S. PATENT DOCUMENTS

| | | | |
|---|---|---|---|
| 2012/0316916 A1 | 12/2012 | Andrews et al. | |
| 2015/0142520 A1* | 5/2015 | Bala .................. | G06Q 30/0203 |
| | | | 705/7.32 |
| 2017/0004128 A1 | 1/2017 | Yoon et al. | |
| 2018/0315125 A1* | 11/2018 | Zheng .................... | G06F 16/00 |
| 2019/0188247 A1* | 6/2019 | Weinreb ................. | G06F 16/14 |

OTHER PUBLICATIONS

Written Opinion dated Oct. 16, 2020 for International Application No. PCT/US2020/043774.
International Search Report dated Oct. 16, 2020 for International Application No. PCT/US2020/043774.

* cited by examiner

400

Receive a document having metadata and a body of text containing an entity identifier, a signal, and a date — 402

Apply a first processing rule to the body of text and/or the metadata to tag the entity identifier to the document — 404

Apply a second processing rule to the body of text and/or the metadata to tag the date to the document — 406

Select an entity record from an entity database wherein the entity record comprises an entity, a plurality of entity identifiers, and association dates for each entity identifier — 408

Tagging the entity to the document in response to the plurality of entity identifiers including the entity identifier and the association dates for the entity identifier including the date — 410

Assigning to the tagged entity an event score based on the content of the body of text, the event score comprising a direction and a magnitude — 412

```
┌─────────────────────────────────────────────────────────────┐
│ Ingest a first set of documents from a data source for      │
│ processing through a computer-based system having a first   │
│ pipeline comprising a first plurality of processing rules,  │
│ wherein the first set of documents is stored in a content   │
│ database                                                    │
└─────────────────────────────────────────────────────────────┘
                              │ — 602
                              ▼
┌─────────────────────────────────────────────────────────────┐
│ Processing the first set of documents with the first        │
│ plurality of processing rules to generate a first data set  │
│ comprising a first plurality of signals and a first         │
│ plurality of entities tagged to the first set of documents  │
└─────────────────────────────────────────────────────────────┘
                              │ — 604
                              ▼
┌─────────────────────────────────────────────────────────────┐
│ Adding a second pipeline comprising a second set of         │
│ processing rules to the computer-based system               │
└─────────────────────────────────────────────────────────────┘
                              │ — 606
                              ▼
┌─────────────────────────────────────────────────────────────┐
│ Processing the first set of documents with the second       │
│ plurality of processing rules to generate a second data set │
│ comprising a second plurality of signals and a second       │
│ plurality of entities tagged to the first set of documents, │
│ wherein the first data set and second data set are stored   │
│ in an unstructured data set                                 │
└─────────────────────────────────────────────────────────────┘
                              │ — 608
                              ▼
┌─────────────────────────────────────────────────────────────┐
│ Selecting the first data set for delivery in response to an │
│ end user requesting a lens that applies to the first        │
│ pipeline                                                    │
└─────────────────────────────────────────────────────────────┘
                              │ — 610
                              ▼
┌─────────────────────────────────────────────────────────────┐
│ Transmitting analytics of the first data set in response to │
│ the end user selecting the lens that applies to the first   │
│ pipeline                                                    │
└─────────────────────────────────────────────────────────────┘
                                — 612
```

FIG. 6

SYSTEMS, METHODS, AND DEVICES FOR GENERATING REAL-TIME ANALYTICS

FIELD

The present disclosure relates to data processing and retrieval to produce analytics in real-time and, in particular, to data processing and retrieval using multi-pipeline architecture and point-in-time aliasing to assess Environmental, Social, and Governance (ESG) signals generated by entities.

BACKGROUND

Large data sets exist in various sizes and structures, with the largest data sets today no longer measured in mere terabytes or petabytes. The large volume of data may be collected and stored in a raw, unstructured, and relatively undescriptive format. Data sets this large pose obstacles to indexing, searching, ordering, processing, and digesting in a useful manner.

For example, generating insights from a large unstructured data set can be a resource intensive endeavor. Processing power and storage speeds are often strained to digest data quickly enough to satisfy the end user. To compound the issue, some outputs are useful only in real-time or near-real-time. Generating such outputs in real-time is often resource prohibitive with currently available data structures and processing techniques.

Data processing for news sources is often driven by human analysts. A human may evaluate the day's news stories by applying predetermined criteria and then analyze the data and generate a score or rating based on predetermined criteria. The human evaluation step typically found in news data processing tends to make reprocessing data in real-time nearly impossible as a human would have to revisit every historical story to apply new criteria to the previously filtered out news stories. Once the human analyst processes a document the result is added to a result set with the analysis related to the document fixed as of that point in time, because the human analyst cannot reprocess the volume of historic documents using new or updated methodologies. New evaluation approaches can typically be applied to incoming data only on a going-forward basis. The result may be a rigid one-size-fits-all product that cannot be rebuilt looking backwards using different lenes reflective of current sensibilities.

SUMMARY

Systems, methods, and devices of the present disclosure (collectively, "Systems") may generate and deliver real-time analytics, in accordance with various embodiments. The Systems may ingest content from a plurality of data sources with the content including ingested documents referencing entities and events relevant to the ESG signals. The content may be stored in a content database. The System may also identify metadata and a body of text associated with each document to produce a set of preprocessed documents. An entity may be tagged to a first preprocessed document from the set of preprocessed documents, and the document may include a first document identifier. The System may generate an event score related to a first ESG signal including a direction and a magnitude associated with an event identified in the body of text. The event score may be tagged to the document. The system may write to an unstructured data set the document identifier in association with the tagged entity and the tagged event score for delivery to an end user in a lens.

In various embodiments, the System tags the entity to the first preprocessed document in response to a first body of text from the first preprocessed document including an entity identifier. The System may identify the entity for tagging to the first preprocessed document by selecting a record from an entity database using the entity identifier as a criterion to lookup the entity. A first processing rule of a first pipeline may be applied to at least one of a first body of the text or a first set of metadata associated with the first preprocessed document to tag the entity identifier to the first preprocessed document. A second processing rule of a first pipeline may be applied to at least one of the first body of the text or a first set of metadata associated with the first preprocessed document to tag a first date to the first preprocessed document.

In various embodiments, the System may retrieve a record from an entity database. The record may include the entity, the entity identifier, and association dates reflecting periods when the entity was associated with the entity identifier. The entity may be tagged to the first preprocessed document in response to the association dates including the first date. The computing cluster may also tag the entity to the first preprocessed document in response to the record including the entity.

In various embodiments, the System may apply a second processing rule of a second pipeline to at least one of the first body of the text or the first set of metadata associated with the first preprocessed document to tag the first preprocessed document with a second event score related to a second ESG signal. The System may load a second pipeline having a second plurality of processing rules that are at least partially distinct from a first plurality of processing rules of the first pipeline, and then reprocess the content stored in the content database through the second pipeline to backfill the unstructured data set with tags generated by the second plurality of processing rules. The content stored in the content database may be reprocessed to apply the second processing rule to the set of ingested documents. A publication date of each document from the set of ingested documents may be earlier than a creation date of the second processing rule. The System may remove excluded documents from the set of ingested documents in response to the documents satisfying exclusion rules.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the illustrations.

FIG. 4 illustrates an exemplary process for tagging an entity to a document based on an entity identifier and a date, in accordance with various embodiments;

FIG. 6 illustrates an exemplary process for reprocessing data using new processing rules of a newly added pipeline in a multi-pipeline architecture, in accordance with various embodiments.

DETAILED DESCRIPTION

Figure 1:
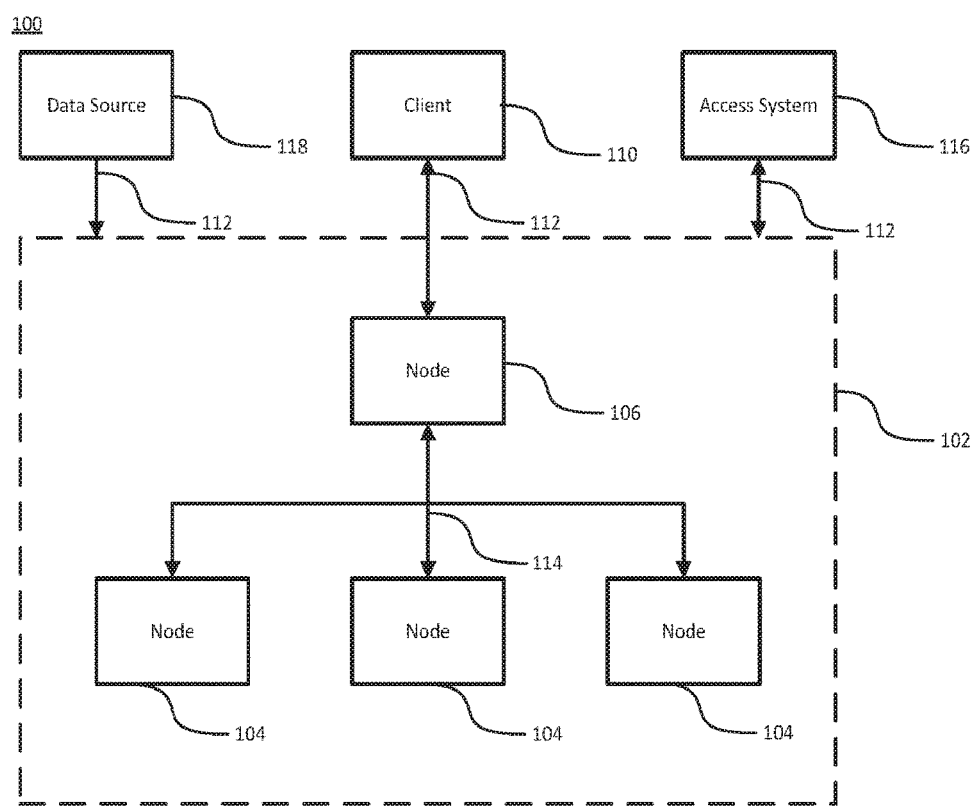
FIG. 1 illustrates an exemplary computer-based system for ingesting, processing, writing, and reading unstructured data sets, in accordance with various embodiments.

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized, and that logical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Furthermore, any reference to singular includes plural embodiments, and any reference to more than one component may include a singular embodiment. As used herein, the term "unstructured data sets" may refer to partially or fully unstructured or semi-structured data sets including irregular records when compared to a relational database. An unstructured data set may comprise, for example, journal articles, news articles, periodical publications, segments of books, bibliographical data, market data, social media feeds, converted videos, or other publications. An unstructured data set may be compiled with or without descriptive metadata such as column types, counts, percentiles, custom scoring and/or other interpretive-aid data points.

As used herein, the term "entity" may describe events, corporate entities, municipalities, brands, countries, geographic locations, or other entities related to or referenced by text, video, or audio content. The terms "signal" and "categorization" may refer to a topic or criteria on which the systems and methods described herein evaluate an entity. For example, systems and methods described herein may negatively score a corporation's data security signal based on news coverage of a data breach event where the corporate entity exposed personally identifiable information. Systems and methods of the present disclosure may assess and quantify Environmental, Social, and Governance (ESG) signals related to entities of interest based on various frameworks. Examples of suitable frameworks may include the materiality framework endorsed by the Sustainability Accounting Standards Board (SASB) and described at https://www.sasb.org/standards-overview/materiality-map/. Another exemplary framework for assessing ESG signals is the Sustainable Development Goals (SDG) as described by the United Nations at https://www.un.org/sustainabledevelopment/sustainable-development-goals/. Still another exemplary framework for assessing ESG signals might be one endorsed by the Task Force on Climate-related Financial Disclosures (TCFD) available at https://www.fsb-tcfd.org/. ESG signals may thus be evaluated to assess whether a company's behavior tend to align with or deviate from the principles of each framework.

As used herein, the term "real-time" may refer to a period ranging from instantaneous to nearly instantaneous. For example, real-time results may include results served within a fraction of a second, within 5 seconds, within 10 seconds, or even under a minute in certain contexts. Non-real-time results from data processing and ingestion as described herein may be delivered in longer timeframes such as, for example, by the minute, by the hour, or by the day.

With reference to FIG. 1, a distributed file system (DFS) 100 is shown, in accordance with various embodiments. DFS 100 comprises a distributed computing cluster 102 configured for parallel processing and storage. Distributed computing cluster 102 may comprise a plurality of nodes 104 in electronic communication with the other nodes as well as a control node 106. Processing tasks may be split among the nodes of distributed computing cluster 102 to improve throughput and enhance storage capacity, with each node capable of indexing data stored on its local resources. Distributed computing cluster 102 may leverage computing resources and software tools of modern data centers such as those offered by Amazon Web Services (AWS) or Microsoft Azure, for example. Distributed computing cluster 102 may also be a stand-alone computing array with some of nodes 104 comprising a distributed storage system and some of nodes 104 comprising a distributed processing system.

In various embodiments, nodes 104, control node 106, and client 110 may comprise any devices capable of receiving and/or processing an electronic message via network 112 and/or network 114. For example, nodes 104, node 106, or client 110 may take the form of a computer or processor, or a set of computers/processors, such as a system of rack-mounted servers. However, other types of computing units or systems may be used, including laptops, notebooks, hand held computers, personal digital assistants, cellular phones, smart phones (e.g., iPhone®, BlackBerry®, Android®, etc.) tablets, smart wearables, or any other device capable of receiving data over the network.

In various embodiments, client 110 may submit requests to control node 106. Control node 106 may distribute the tasks among nodes 104 for processing to complete the job intelligently. Control node 106 may thus limit network traffic and enhance the speed at which incoming data is processed. In that regard, client 110 may be a separate machine from distributed computing cluster 102 in electronic communication with distributed computing cluster 102 via network 112. A network may be any suitable electronic link capable of carrying communication between two or more computing devices. For example, network 112 may be local area network using TCP/IP communication or wide area network using communication over the Internet. Nodes 104 and control node 106 may similarly be in communication with one another over network 114. Network 114 may be an internal network isolated from the Internet and client 110, or network 114 may comprise an external connection to enable direct electronic communication with client 110 and the internet.

In various embodiments, data may be ingested and processed to generate outputs from inputs. In that regard, input variables may be mapped to output variables by applying data transformations to the input variables and intermediate variables generated from the input values. Nodes 104 may process the data in parallel to expedite processing. Furthermore, the transformation and intake of data as disclosed below may be carried out in memory on nodes 104. For example, in response to receiving a source data file of 100,000 records, a system with 100 nodes 104 may distribute the task of processing 1,000 records to each node 104 for batch processing. Each node 104 may then process the stream of 1,000 records while maintaining the resultant data in memory until the batch is complete for batch processing jobs. The results may be written, augmented, logged, and written to disk for subsequent retrieval. The results may be written to disks using various unstructured data storage formats.

In various embodiments, an access system 116 may be in electronic communication with distributed computing cluster 102 to facilitate access and retrieval of data in distributed computing cluster 102. Access system 116 may comprise, for example, a web server hosting a web interface for users to selectively engage with data stored in distributed computing cluster 102. The access system 116 may thus be capable of receiving and responding to HTTP requests from web browsers relating to authentication, user profiles, custom data filtering, custom data scoring, and otherwise interacting with web browsers. Access system 116 may also interact with a native application suitable for running on laptops, smartphones, personal computers, or other computing devices suitable for retrieving, displaying, manipulating, and sending data.

In various embodiments, data sources 118 may be in communication with computing cluster 102 for data ingestion. Data sources 118 may include targeted sources, aggregated sources, web-crawled sources, known reputable sources, or other sources suitable for ingestion into an unstructured data system. Data sources 118 may be a curated list of sources taking into consideration a white list of selected feeds, a blacklist of excluded feeds, or otherwise applying a criterion to selectively exclude data from ingestion and enhance the reliability of the ingested data. Data sources 118 may also include customer-specific data ingested for processing using preestablished lenses or custom lenses, or different aggregation and filter techniques.

In various embodiments, DFS 100 may aggregate categories or a subset of categories requested by a customer. DFS 100 may also process custom categories developed in response to customer requests to fulfill varying needs of end users. DFS 100 may also support multiple lenses such as SASB, SASB Materiality, SDG, or other suitable frameworks to analyze and score data in a manner consistent with the desired framework.

In various embodiments, DFS 100 may store data in a time series database to capture an ongoing timeline of an entity's events over time. DFS 100 may thus flexibly update and reprocess an entity's data accumulated over time in response to updated pipeline architecture, custom categories, newly identified signals, or other outputs yielded in part by processing and tagging entity data. In various embodiments, corporate mergers may be applied retroactively to associate news and other data with the acquiring entity when previously the news and other data was associated with the acquired entity. DFS 100 may use point-in-time aliasing to assign behavior to a controlling entity that was responsible for the behavior at the time the behavior occurred but was previously assigned to a formerly controlling entity that was no longer responsible for the behavior.

The following example illustrates point-in-time aliasing using DFS 100, in accordance with various embodiments. A company known by Tradename 1 was involved in a newsworthy event that affects analytics of the company on Jul. 1, 2015. The event was reported in news outlets using Tradename 1 as an identifier in the following days. Tradename 1 was owned by Entity A until Jan. 1, 2010 when Entity B acquired Entity A and began operating using Tradename 1. In 2015, DFS 100 was not configured to detect and account for corporate transactions changing ownership of tradenames, so the newsworthy event may not have been assigned to Entity B despite Entity B controlling Tradename 1 after the corporate transaction on Jan. 1, 2010. In 2020, DFS 100 was reconfigured to detect and tag data to different entities based on the time a newsworthy event occurred. DFS 100 may reprocess data associated with the newsworthy event of Jul. 1, 2015 and correctly assign responsibility for the newsworthy to Entity B.

Figure 2:
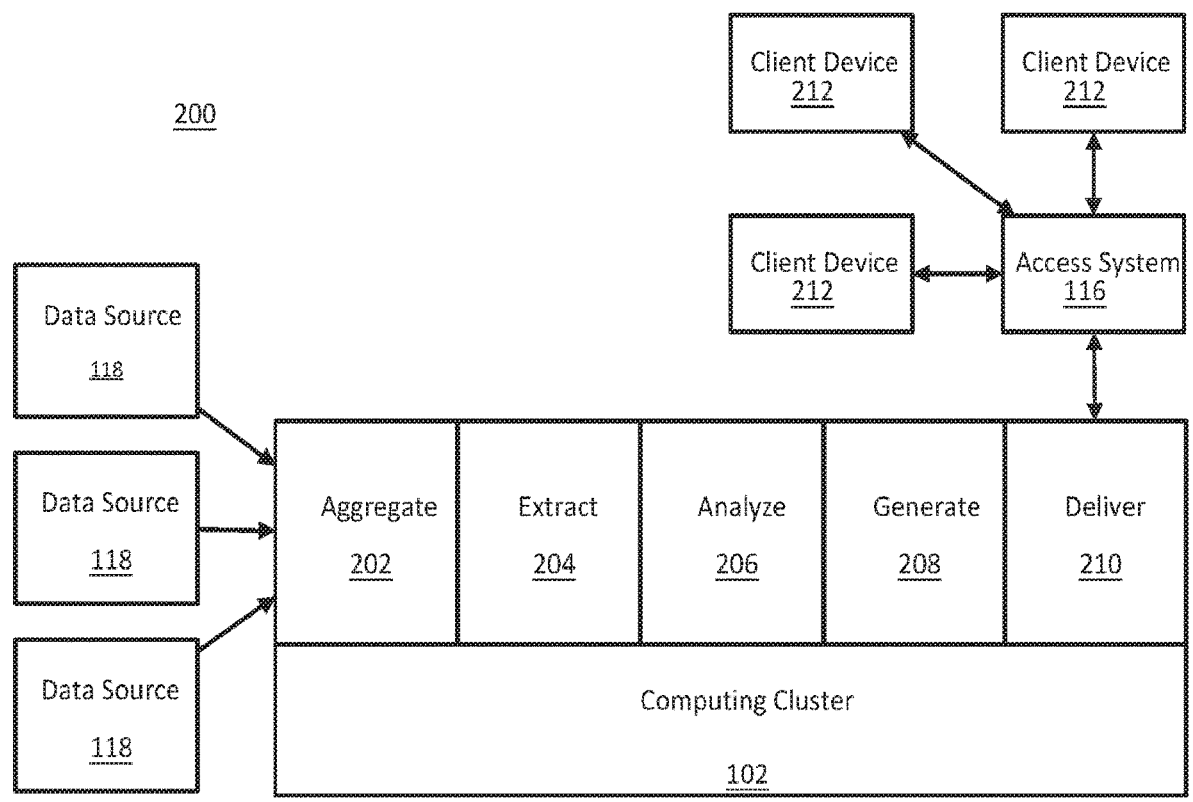
FIG. 2 illustrates an exemplary data flow for ingesting text and video data from various news outlets, article sources, and content sources to support sentiment scoring and other predictive analytics for entities, in accordance with various embodiments.

With reference to FIG. 2, data flow 200 is shown for ingesting text, video, and audio information related to entities from news outlets, trade journals, social media, watchdogs, nongovernmental organizations, and other content sources to support sentiment scoring and predictive analytics related to signals or categories, in accordance with various embodiments. DFS 100 of FIG. 1 may use data flow 200 to ingest data and deliver results to end users. DFS 100 may maintain time series data as information is ingested over time resulting in an ongoing timeline of the entity's events over the entire data set. As events happen to the entity or as the entity evolves through corporate transitions, the flexibility of DFS 100 and data flow 200 allow data to be recalculated to reflect these changes. Reprocessed data may then reflect the updated state in downstream data points during delivery to end users.

In various embodiments, data sources 118 may feed into computing cluster 102 running an aggregation engine 202. Aggregation engine 202 may compile and preprocess data received electronically from various types of data sources. Aggregation engine 202 may accept data from targeted sources, aggregated data from aggregate sources, targeted web crawling from selected internet sources, RSS feeds, flat files, CSV files, JSON files, XML files, data backups, or other data sources capable of conveying text, audio, or video content related to entities. For example, aggregate engine 202 may accept text articles from a news aggregator or news outlet.

In various embodiments, content compiled by aggregation engine 202 may feed into extraction engine 204. Extraction engine 204 may sift through content by removing structure, converting audio and video to text, and otherwise eliminating unsuitable or undesirable content from data feeds. Extraction engine 204 may remove content by identifying undesirable patterns, structures, or content types such as, for example, raw data tables, images, unsupported languages, excluded terminology, resumes, forms, suggestive titles, excessive length, duplicative text, or stock reports. Extraction engine 204 may thus apply predefined criteria to content to exclude unreliable, inaccurate, unwanted, or disreputable sources. Extraction engine 204 may process the selected content to detect entities, detect signals, and score signal sentiment, which extraction engine 204 may tag for future retrieval and processing.

In various embodiments, analysis engine 206 may further operate on the content, detected entities, detected signals, and signal scores generated by extraction engine 204. Analysis engine 206 may parse content to detect events and identify entities, measure density, perform salience clustering, and assess volatility and confidence. For example, analysis engine 206 may identify that an oil spill occurred at Deepwater Horizon with news stories breaking starting Apr. 20, 2010, and analysis engine 206 may tag content covering the spills with an event identification to facilitate retrieval and analysis of articles associated with the event. Analysis engine 206 may also parse content and assess materiality of signals by applying a materiality framework such as the materiality framework endorsed by SASB or the SDG described by the United Nations. In that regard, analysis engine 206 may weight signals related to an entity based on the materiality of a particular signal to the market segment or industry in which the entity operates. DFS 100 using data flow 200 may weigh scores by the data volume flowing through each category to further enhances a lens or framework (e.g., SASB or SDG) with a dynamic view of materiality.

In various embodiments, generation engine of data flow 200 may generate entity scorecards, entity trends, portfolio monitoring, investment opportunities, and alpha in response to the data processed by extraction engine 204 and analysis engine 206. Content and metadata may pass from extraction engine 204 and analysis engine 206 as inputs into generation engine 208 in response to passing filter checks and meeting a threshold selected to balance recall (how much relevant content is selected) with precision (how much of selected content is relevant). Inaccurate or unreliable data may be filtered or omitted from the data set based on the filters and processing steps in extraction engine 204 and analysis engine 206.

In various embodiments, the data generated by extraction engine 204, analysis engine 206, and generation engine 208 may be suitable for end user consumption. Delivery engine 210 may package the data and content in a format suitable for consumption by an end user. For example, an end user operating client device 212 in electronic communication with access system 116 may request content packaged by delivery engine 210 for display locally on client device 212. In that regard, client device 212 may run a web browser in communication with a web server running on access system 116 and hosting the information packaged by delivery engine 210. Other suitable delivery methods may include, for example, an Application Programming Interface (API) or data streams such as flat files, CSV files, JSON files, XML files, RSS feeds, or other data communication medium suitable for delivering data to an end user.

Figure 3:
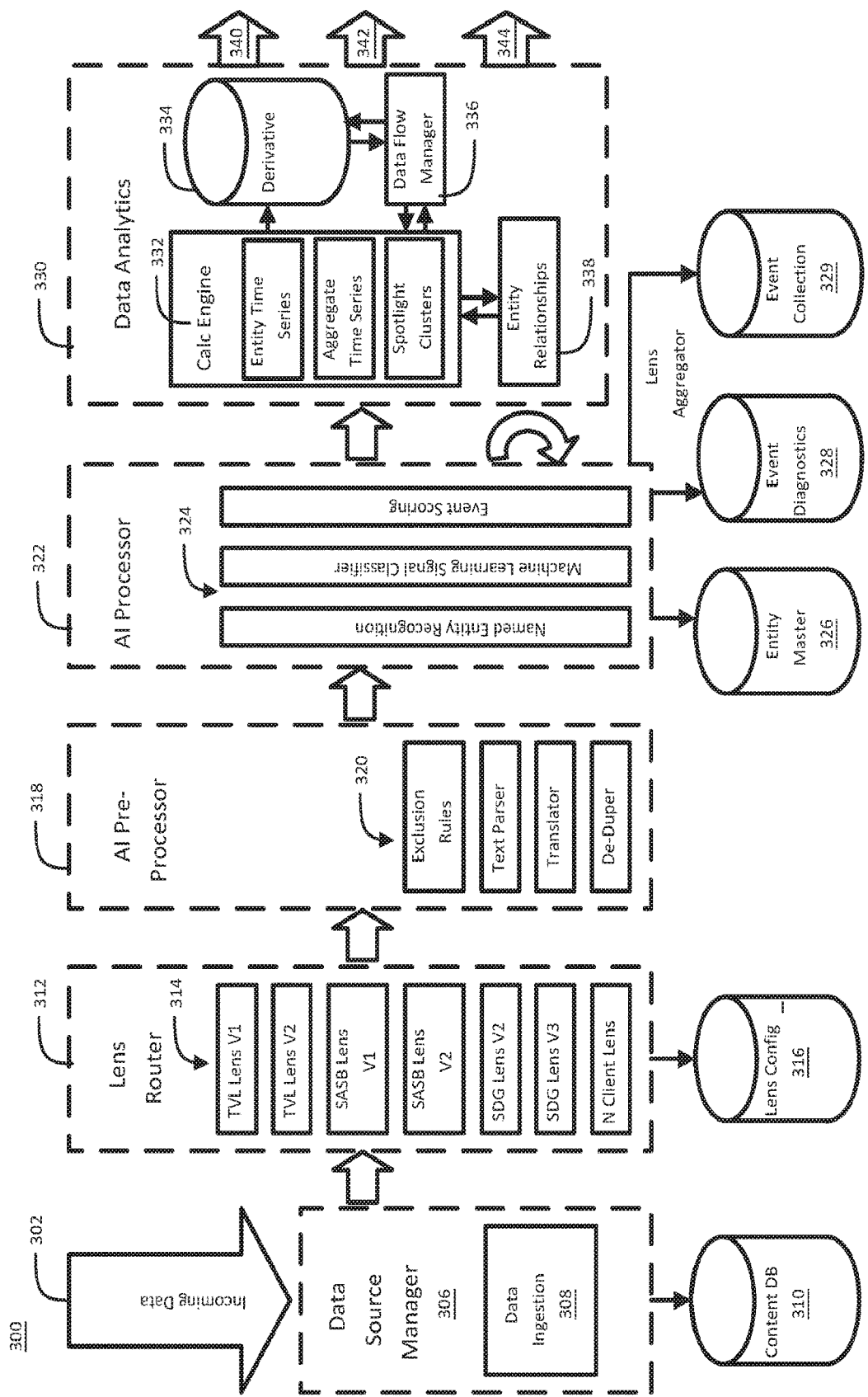
FIG. 3 illustrates an exemplary data pipeline architecture for processing data on a computer-based system in support of sentiment scoring and other predictive analytics, in accordance with various embodiments.

Referring now to FIG. 3, a data pipeline architecture 300 is shown suitable for execution using a computer-based system (e.g., DFS 100), in accordance with various embodiments. Data processing architecture 300 may by implemented on a big data system such as, for example, DFS 100 (of FIG. 1) by executing one or more steps at one or more node 104 or 106 (of FIG. 1). Data pipeline architecture may implement data flow 200 to ingest data and deliver analytics to end users. Data pipeline architecture 300 may receive incoming data 302 with a data source manager 306 to facilitate data ingestion 308. Incoming data 302 may comprise text, video, and/or audio information related to entities from news outlets, trade journals, social media, watchdogs, nongovernmental organizations, and/or other content sources. Incoming data 302 may come directly from originating news sources such as, for example, the New York Times® or Wallstreet Journal® in a digital format. An individual text, video, or audio news story or piece of data is referred to herein as a document. Incoming data 302 may also be collected by a third-party and packaged in a data feed. Incoming data 302 may also be retrieved by web crawlers or other active data collection techniques suitable for collecting content related to events and stories related to entities. Incoming data 302 may comprise a custom data set supplied by an end user seeking analysis of a particular data set.

In various embodiments, data source manager 306 may write the ingested data to a content database 310 and/or read data from content database 310. Content database 310 may retain data to facilitate reprocessing in the future using a revised architecture, applying different filtering rules, identifying additional signals, and otherwise supporting backward compatibility for future enhancements. Content database 310 may capture metadata relating to documents in incoming data 302 such as, for example, originating data source, date, author, title, body, or other data detectable during data ingestion 308. Data source manager 306 may thus perform steps and processing associated with aggregation engine 202 of FIG. 2.

In various embodiments, lenses may be applied to data to produce analytics formed or viewed differently depending on the lens applied. Lenses may be applied at any stage of processing or delivery. Lenses 314 may comprise various frameworks, processing paths, and incoming data implemented at various times. The lens router 312 may read and write lens configurations for each lens 314 to a lens configuration database 316.

In various embodiments, a lens router 312 may direct data into various processing paths depending for which of lenses 314 the incoming data 302 will be relevant. Lens router 312 may use metadata associated with a document to determine to which lenses a document is relevant. Lens router 312 may us, for example, originating data source, date, author, title, body, and/or other suitable data to route a document for further processing. Documents may be sent by lens router 312 to one lens, many lenses, or no lenses in response to metadata for documents matching a lens configuration. Lens router 312 enables data pipeline architecture 300 to scale with large data sets by limiting unnecessary processing as a result of routing data to relevant processing paths.

For example, Proprietary Lens V1 and Proprietary Lens V2 may comprise proprietary lenses where incoming data is processed and scored according to predetermined criteria. Proprietary Lens V1 may be built on a processing path that scores fewer or different signals than the Proprietary Lens V2 on overlapping but potentially different pools of incoming data 302. SASB Lens V1 and SASB Lens V2 may comprise lenses based on the SASB architecture. Ingested data may thus be routed into one or more processing paths corresponding to the lenses 314 to which the data is relevant.

Artificial Intelligence preprocessor 318 (AI preprocessor) of data pipeline architecture 300 may process documents and metadata from data ingestion, in accordance with various embodiments. AI preprocessor 318 may perform one or more preprocessing step 320. Preprocessing steps 320 may be applied based on processing paths selected by lens router 312. Preprocessing steps 320 may filter documents or otherwise place documents in condition for substantive processing. AI preprocessor may thus apply steps and processing associated with extraction engine 204 of FIG. 2.

In various embodiments, AI preprocessor 318 may apply exclusion rules as a preprocessing step 320. Documents may be excluded from further processing based on rules. AI preprocessor may exclude up to 90%, 95%, 97%, 98% or 99% of documents based on exclusion rules. For example, documents with the word "resume" in their title may be excluded from further processing. In another example, a document referencing two sports teams and a game score may be excluded from further processing. In still another example, a document from a third-party aggregated data source may be excluded because the underlying original publisher of the document is known to be unreliable.

In various embodiments, AI preprocessor 318 may apply text parsing rules as a preprocessing step 320. Text parsing rules may serve to clean the text of a document. For example, text parsing rules may strip embedded URLs, references, third-party directions, boilerplate text, advertisements, disclaimers, or other content irrelevant to the entity and event captured in the document. Text parsing rules may also apply image recognition or audio recognition to convert video or audio documents into text-based documents for further processing.

In various embodiments, AI preprocessor 318 may apply translation rules as a preprocessing step 320. Translation rules may detect and translate foreign language documents into the human language or languages used by data pipeline architecture 300 for text recognition, pattern matching, and AI processing. For example, AI preprocessor 318 may translate all documents into the English language to support further document processing and AI training using English-based rules.

In various embodiments, AI preprocessor 318 may apply de-duplication rules as a preprocessing step 320. Deduping may enable data pipeline architecture to detect and eliminate duplicate articles arriving in incoming data 302 from various sources.

Artificial Intelligence processor 322 (AI preprocessor) of data pipeline architecture 300 may process documents and metadata from AI preprocessor 318 that are cleaned and in condition for substantive processing to analyze relevant data and identify signals, in accordance with various embodiments. AI processor 322 may perform one or more processing step 324 to substantively evaluate a document and identify entities, events, signals, and other data points for presentation to an end user and/or further analysis. AI processor 322 may thus apply steps and processing associated with analysis engine 206 of FIG. 2.

In various embodiments, AI processor 322 may apply rules for named entity recognition as a processing step 324. Named entity recognition in processing steps 324 may include applying text recognition to detect known identifiers associated with an existing entity. Known entity identifiers such as tradenames, corporate names, corporate acronyms, or other identifiers for entities may be written to and read from entity master database 326. Documents may thus be attributed to the correct entity based on entity identifiers detected in the documents being associated with various entities. AI processor may store event diagnostics in event diagnostics database 328 and may run a lens aggregator to collect events in event collection database 329 to support various lenses.

In various embodiments, entity identifiers may include a time range during which the entity identifier is associated with a particular entity. Entity identifiers may be associated with different entities at different points in time as a result of corporate transactions such as mergers, sales, acquisitions, bankruptcies, dissolutions, brand launches, or other transactions though which an entity identifier might become associated or disassociated with entities. Named entity recognition may thus include using both an entity identifier and a date to associate a document with an entity. DFS 100 using data processing architecture 300 may thus tag unstructured data to companies on a point in time basis.

For example, Whole Foods® acquired Wild Oats Marketplace on Aug. 28, 2007, so on that date the entity identifier "Wild Oats Market" became associated with Whole Foods. Whole Foods was acquired by Amazon® on Aug. 29, 2017, so on that date the entity identifiers "Wild Oats Market" and "Whole Foods" became associated with Amazon. AI processor 322 may thus attribute to Amazon documents published after Aug. 29, 2017 and directed to an entity identified as "Wild Oats Market" or "Whole Foods." Named entity recognition is described further in reference to FIG. 4.

In various embodiments, AI processor 322 may include a machine learning signal classifier as a processing step 324. A machine learning signal classifier may use text recognition to identify signals in documents. Signals may comprise a topic and a sentiment relative to a framework. For example, AI processor 322 may identify a signal relating to forest fires in a document discussing behavior by Pacific Gas and Electric as a potential cause and as a result tag the forest fire signal and a negative sentiment to the document. AI processor 322 may be configured with rules to identify hundreds of signals relevant to various frameworks and/or lenses in documents.

In various embodiments, AI processor 322 may include event scoring as a processing step 324. Event scoring may include identifying an event relevant to a signal and an entity. For example, event scoring may detect that Apple® has created solar farms and reduced its carbon emissions, which is relevant to an emissions signal. Event scoring may then assess a direction (e.g., a positive sentiment or negative sentiment) associated with the event as well as a magnitude (e.g., greatly positive, slightly positive, neutral, slightly negative, or greatly negative) for the event. The magnitude may be normalized on a scale applied across all signals relevant to a framework.

In various embodiment, data processing architecture 300 may include data analytics 330, in accordance with various embodiments. Calc engine 332 may calculate analytics on signals and data received from AI processor 322. Calc engine 332 may calculate a time series for each entity tagged in one or more document in AI processor 322 during named entity recognition. Calc engine 332 may calculate an aggregate time series. Calc engine 332 may also identify spotlight clusters based on an increased volume of articles related to an incident.

Data processing architecture 300 may also comprise delivery mechanisms such as an application 340 for presentation and manipulation, APIs 342 for integration into custom client interfaces, or data feeds 344 for ingestion into client data sets. Delivery mechanisms of data processing architecture 300 may thus apply steps associated with delivery engine 210 of FIG. 2. Data processing architecture 300 ingests data, selectively processes data, and analysis data to generate signals associated with entities in various media. Calc engine 332 may write analytic results, entity time series, aggregate time series, spotlight clusters, and other data for output to clients to a derivatives database 334. Data flow manager 336 may read to and write from derivatives database 334 in communication with calc engine 332. Calc Engine 332 may read and write entity relationships 338 in response to natural language patterns identified in text of documents.

Referring now to FIG. 4, an exemplary process 400 is shown for identifying entities in documents using a computer-based system, in accordance with various embodiments. For example, a DFS 100 (of FIG. 1) may execute process 400 using data source manager 306, lens router 312, AI preprocessor 318, AI processor 322, or data analytics 330 data processing architecture 300 of FIG. 3. Continuing the above example, process 400 may be executed during named entity recognition, machine learning signal classification, and/or event scoring in AI processor 322.

In various embodiments, process 400 may include receiving a document having metadata and a body of text containing an entity identifier, a signal, and a date (Step 402). The document may be ingested in incoming data 302 (of FIG. 3) from a data source 118 (of FIG. 1). The document may include text, video, audio or other information related to entities from news outlets, trade journals, social media, watchdogs, nongovernmental organizations, and other content sources to support sentiment scoring and predictive analytics related to signals or categories. The document may be processed to identify metadata and clean the document prior to step 402.

In various embodiments, a computer-based system may apply a first processing rule to at least one of the body of text and the metadata to tag the entity identifier to the document (Step 404). A processing rule may comprise a pattern matching technique such as regular expressions, tree patterns, string matching, natural language processing, or other suitable method of detecting the presence of a pattern in text. The processing rule may identify predetermined entity identifiers stored in entity master database 326 (of FIG. 3). The processing rule may identify likely entity identifiers not stored in the entity master database 326 for future assessment and potential addition to entity master database 326. The term tag as used in reference to process 400 means to create an association in a data store such as an unstructured data set.

In various embodiments, the computer-based system may apply a second processing rule to the body of text and/or metadata to tag the date to the document (Step 406). The second processing rule may comprise a pattern matching technique such as regular expressions, tree patterns, string matching, or other suitable method of detecting the presence of a date in text. The date may be an event date, a publication date, or any other date suitable for ascribing ownership of an entity identifier to an entity on the date.

In various embodiments, the computer-based system may select an entity record from an entity database wherein the entity record comprises an entity, a plurality of entity identifiers, and association dates for each entity identifier (Step 408). Each entity identifier may be associated with an entity in the entity database. The association may be retrievable such that the computer-based system can retrieve a record containing the entity using the entity identifier as selection criteria.

In various embodiments, the entity identifier may be associated with the entity in the entity database over ranges of dates beginning on the date the entity acquires, launches, creates, uses, or otherwise begins to be referenced in documents using the entity identifier. The range of dates may end on the date the entity divests, sells, closes, ceases using, or generally is no longer referenced in documents using the entity identifier. The same entity identifier may thus be associated with different entities on different dates in the entity database to reflect corporate transactions.

In various embodiments, the computer-based system may tag the entity to the document in response to the plurality of entity identifiers including the entity identifier and the association dates for the entity identifier including the date (Step 410). The computer-based system may retrieve records from the entity database using the entity identifier and the date as selection criteria to lookup the entity.

Revisiting the example disclosed above for clarity, assume Whole Foods® acquired Wild Oats Marketplace on Aug. 28, 2007, so on Aug. 28, 2007 the entity identifier "Wild Oats Market" became associated with Whole Foods. Whole Foods was later acquired by Amazon® on Aug. 29, 2017, so on that date the entity identifiers "Wild Oats Market" and "Whole Foods" became associated with Amazon. The computer-based system would tag Amazon to documents published after Aug. 29, 2017 and directed to an entity identified as "Wild Oats Market" or "Whole Foods" by using the entity identifier and a date from the document to identify Amazon as the entity that is subject of the document.

In various embodiments, the computer-based system may assign an event score to the tagged entity based on the content of the body of text, the event score comprising a direction and a magnitude (Step 412). The event score may be based on positive or negative actions taken by the entity with respect to a signal. The event score may assign a positive score to an event that embodies a beneficial action when considered in the context of a signal. The event score may assign a negative score to an event that embodies a harmful action when considered in the context of a signal. The event score may also include a magnitude reflective of how beneficial or harmful an action is with respect to a signal.

Figure 5:
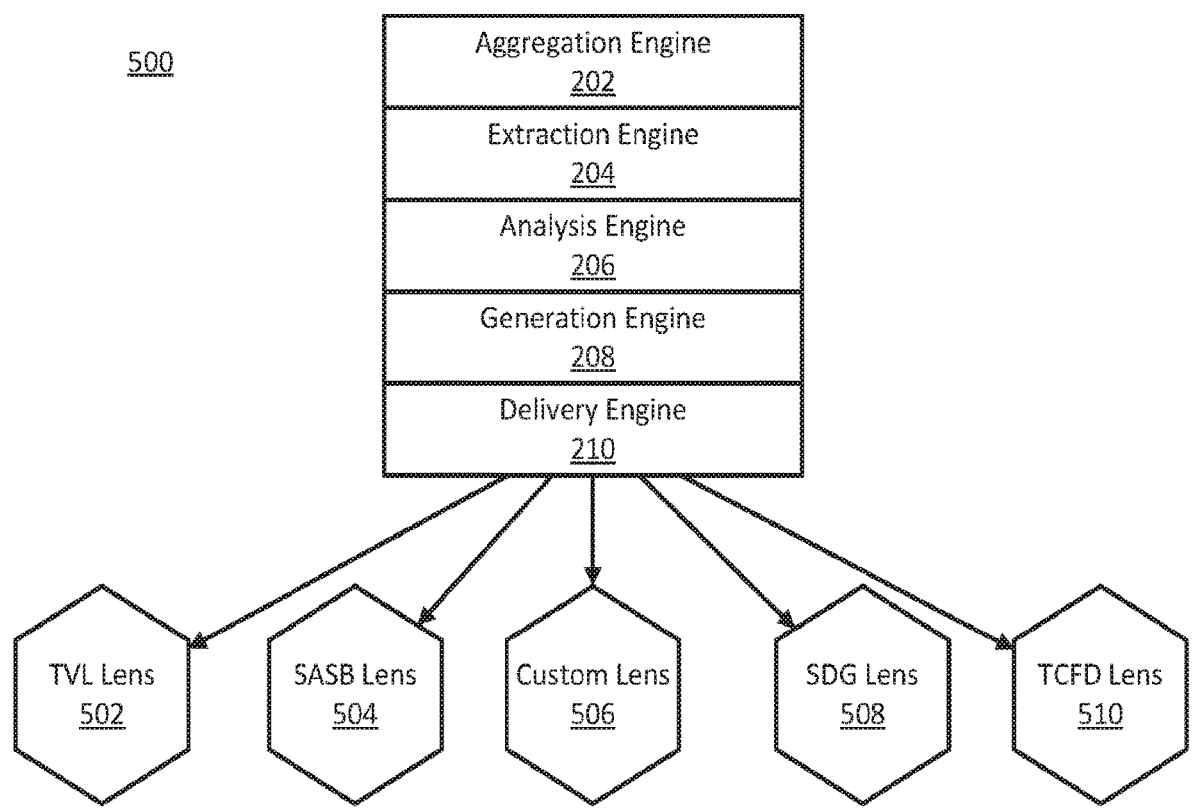
FIG. 5 illustrates a multi-pipeline architecture including multiple processing paths to support multiple lenses for delivery to end users, in accordance with various embodiments.

With reference to FIG. 5, a multi-pipeline architecture 500 is shown for processing data through multiple pipelines and delivering lenses based on different pipelines, in accordance with various embodiments. Multi-pipeline architecture 500 processes data through multiple pipelines to tag signals and entities in documents. The pipelines may each leverage various parts of data processing architecture 300 (of FIG. 3). For example, a first pipeline may omit lens router 312 (of FIG. 3) and process each document in future processing steps regardless of the lens 314 (of FIG. 3) applied to data and analytics and the end of the first pipeline. A second pipeline may include lens router 312 to selectively process documents in future processing steps based on the lens 312.

Continuing the example, the first and second pipelines may both run on the same computer-based system such as, for example, DFS 100 (of FIG. 1). In that regard, a computer-based system may include an aggregation engine 202, extraction engine 204, analysis engine 206, generation engine 208, and delivery engine 210 performing actions described in greater detail above with reference to FIG. 2. Each engine may support processing for multiple pipelines in a modular manner. In that regard, a pipeline may be added to or removed from multi-pipeline architecture without impacting availability of pipelines remaining in services.

In various embodiments, documents processed through multiple processing paths may be tagged according to the logic different processing paths for each pipeline and merged into a single data store. Content may be stored in content database 310 (of FIG. 3) before processing so that content may also be reprocessed in the future in response to a new pipeline going live. New pipelines may thus be formed using historic data without reliance on analysts to revisit each past document. The storage of historic incoming documents and use of AI processing to rebuild the data set of ESG signals enables systems of the present disclosure to backfill data sets enable analysis of past events in light of current viewpoints and signals. For example, corporate behavior that exacerbated the opioid crisis or corporate reactions to the novel coronavirus, events unknown or less significant before 2019, can be assessed retroactively applying current knowledge to detect signals reported on in relation to past events.

In various embodiments, a computer-based system may process historic data and current incoming data the same way for every article to maintain multiple pipelines originating from the same original content. A pipeline may be a version of processing logic present in the processing stack comprising aggregation engine 202, extraction engine 204, analysis engine 206, generation engine 208, and delivery engine 210. Different pipelines may tag documents with signals, entities, and scores by running the processing logic for each pipeline in parallel on the same computer-based system and data processing architecture. The resultant data store may thus include all documents output from any pipeline. Lenses may be applied by selectively retrieving relevant data from the data set containing the output from all active pipelines. Each lens may pull data tagged with signals relevant to that lens.

For example, the Proprietary lens 502 may roll up ESG data related to 14 signals from the data store that were processed using the logic of a first pipeline, and the SDG lens 508 may roll up ESG data related to 18 signals from the data store processed using a third pipeline. The 14 signals for the Proprietary lens may be tagged by the first pipeline using techniques that were later updated or replaced in the third version of the pipeline. The 18 signals for the SDG lens may be tagged by the third pipeline using techniques implemented in the third version of the pipeline and surviving techniques from previous pipelines. The overlapping signals common to the Proprietary lens and the SDG lens may be tagged by applying the rules of both the first and third pipelines. The same document may thus be tagged my multiple pipelines running on the same computer-based system to support different lenses. Current events may be processed and added to the data store using each active pipeline to support compatibility with various versions of live products on the same unstructured data set.

In various embodiments, lenses may be provided to end users to view data and analytics resulting from any active pipeline. The resulting data set from the processing stack of data flow 200 (of FIG. 2) may be selectively rolled-up into subsets that form the output of each pipeline and delivered to end users in a lens. Proprietary lens 502, for example, may include data and analytics resulting from a selected of signals tagged by the processing stack comprising aggregation engine 202, extraction engine 204, analysis engine 206, generation engine 208, and delivery engine 210. SASB lens 504 may include data and analytics from a different subset of signals than Proprietary lens 502, with the signals and analytics in SASB lens 504 reflecting a company's ESG performance as evaluated against the SASB framework. Custom lens 506, SDG lens 508, and TCFD lens 510 may each include data and analytics from different subsets of signals than one another and from Proprietary lens 502 and SASB lens 504 reflecting a company's ESG performance as evaluated against a desired underlying framework. An end user may access available lenses through a preferred delivery method such as an application 340, API 342, or data feed 344.

Referring now to FIG. 6, an exemplary process 600 is shown for reprocessing historical data on a computer-based system to support addition of a new pipeline to a multipipeline data processing architecture, in accordance with various embodiments. Process 600 may be performed by a computer-based system such as, for example, DFS 100 of (FIG. 1) running multi-pipeline architecture 500 (of FIG. 5).

In various embodiments, the computer-based system may ingest a first set of documents from a data source for processing through a computer-based system having a first pipeline comprising a first plurality of processing rules (Step 602). Computer-based system may process the first set of documents with the first plurality of processing rules to generate a first data set comprising a first plurality of signals and a first plurality of entities tagged to the first set of documents (Step 604). A second pipeline may be added or loaded into the computer-based system comprising a second set of processing rules (Step 606).

In various embodiments, the computer-based system may process the first set of documents with the second plurality of processing rules to generate a second data set comprising a second plurality of signals and a second plurality of entities tagged to the first set of documents (Step 608). The first data set and second data set may be stored in an unstructured data set. The first data set may be selected for delivery in response to an end user requesting a lens that applies to the first pipeline (Step 610). The computer-based system may transmit the analytics of the first data set in response to the end user selecting the lens that applies to the first pipeline (Step 612).

By supporting multiple pipelines on the same architecture, a computer-based system may support end users using a previously established and familiar analysis framework at the same time other end users are adopting a newer framework with updated signals and techniques. Old pipelines may thus be maintained and used in parallel with new or updated pipelines to process new incoming documents. Multi-pipeline architecture efficiently supports end users selecting both a desired processing pipeline and a compatible lens comprising data rolled up from the selected pipeline to assess an entity's ESG signals. Multi-pipeline architecture also supports backfilling a dataset by applying a new pipeline with updated processing techniques and signals to historic data while concurrently supporting ongoing updates to the dataset by applying other pipelines to new data in parallel with the newer pipelines.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions.

The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Devices, systems, and methods are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or device that comprises a list of elements does not include only those elements but may include other elements not expressly listed or inherent to such process, method, article, or device.

What is claimed is:

1. A method of analyzing Environmental, Social, and Governance (ESG) signals comprising:
   ingesting, by a computing cluster, content from a plurality of data sources, wherein the content includes a set of ingested documents referencing entities and events relevant to the ESG signals, wherein the content is stored in a content database;
   identifying, by the computing cluster, metadata and a body of text associated with each document from the set of ingested documents to produce a set of preprocessed documents;
   tagging, by the computing cluster, an entity to a first preprocessed document from the set of preprocessed documents, wherein the document comprises a first document identifier, and wherein the entity becomes a tagged entity in response to the tagging;
   generating, by the computing cluster, an event score related to a first ESG signal including a direction and a magnitude associated with an event identified in the body of text, wherein the computing cluster tags the event score to the document, and wherein the event score becomes a tagged event score in response to the generating;
   writing, by the computing cluster and to an unstructured data set, the first document identifier in association with the tagged entity and the tagged event score for delivery; and
   retrieving, by the computing cluster, a record from an entity database;
   wherein:
      the computing cluster tags the entity to the first preprocessed document in response to a first body of text from the first preprocessed document including an entity identifier;
      the computing cluster applies a first processing rule of a first pipeline to at least one of a first body of the text or a first set of metadata associated with the first preprocessed document to tag the entity identifier to the first preprocessed document;
      the computing cluster applies a second processing rule of a first pipeline to at least one of the first body of the text or a first set of metadata associated with the first preprocessed document to tag a first date to the first preprocessed document;
      the record includes the entity, the entity identifier, and association dates reflecting periods when the entity was associated with the entity identifier;
      the computing cluster tags the entity to the first preprocessed document in response to the association dates including the first date; and
      the computing cluster tags the entity to the first preprocessed document in response to the record including the entity.

2. The method of claim 1, further comprising identifying, by the computing cluster, the entity for tagging to the first preprocessed document by selecting a record from an entity database using the entity identifier as a criterion to lookup the entity.

3. The method of claim 1, further comprising applying, by the computing cluster, a second processing rule of a second pipeline to at least one of the first body of the text or the first set of metadata associated with the first preprocessed document to tag the first preprocessed document with a second event score related to a second ESG signal.

4. The method of claim 1, further comprising:
   adding, to the computing cluster, a second pipeline having a second plurality of processing rules that are at least partially distinct from a first plurality of processing rules of the first pipeline; and
   reprocessing, by the computing cluster, the content stored in the content database through the second pipeline to backfill the unstructured data set with tags generated by the second plurality of processing rules.

5. The method of claim 4, wherein the computing cluster reprocesses the content stored in the content database to apply the second processing rule to the set of ingested documents, wherein a publication date of each document from the set of ingested documents is before a creation date of the second processing rule.

6. The method of claim 1, further comprising removing, by the computing cluster, an excluded document from the set of ingested documents in response to the first document satisfying an exclusion rule.

7. A computer-based system for analyzing Environmental, Social, and Governance (ESG) signals, comprising:
   a processor; and
   a tangible, non-transitory memory configured to communicate with the processor, the tangible, non-transitory memory having instructions stored thereon that, in response to execution by the processor, cause the computer-based system to perform operations comprising:
      ingesting, by the processor, content from a plurality of data sources, wherein the content includes a set of ingested documents referencing entities and events relevant to the ESG signals, wherein the content is stored in a content database;
      identifying, by the processor, metadata and a body of text associated with each document from the set of ingested documents to produce a set of preprocessed documents;
      tagging, by the processor, an entity to a first preprocessed document from the set of preprocessed documents, wherein the document comprises a first document identifier;
      generating, by the processor, an event score related to a first ESG signal including a direction and a magnitude associated with an event identified in the body of text, wherein the computer-based system tags the event score to the document;

writing, by the processor, to an unstructured data set the first document identifier in association with the tagged entity and the tagged event score for delivery; and retrieving, by the processor, a record from an entity database including the entity, the entity identifier, and association dates reflecting periods when the entity was associated with the entity identifier;

wherein the processor:

applies a first processing rule of a first pipeline to at least one of a first body of the text or a first set of metadata associated with the first preprocessed document to tag an entity identifier to the first preprocessed document;

applies a second processing rule of a first pipeline to at least one of the first body of the text or a first set of metadata associated with the first preprocessed document to tag a first date to the first preprocessed document;

tags the entity to the first preprocessed document in response to the association dates including the first date; and tags the entity to the first preprocessed document in response to the record including the entity.

8. The computer-based system of claim 7, further comprising:

loading, by the processor, a second pipeline having a second plurality of processing rules that are at least partially distinct from a first plurality of processing rules of the first pipeline; and reprocessing, by the processor, the content stored in the content database through the second pipeline to backfill the unstructured data set with tags generated by the second plurality of processing rules.

\* \* \* \* \*